(12) United States Patent
Kurien et al.

(10) Patent No.: US 11,023,558 B1
(45) Date of Patent: Jun. 1, 2021

(54) EXECUTING FUNCTIONS ON-DEMAND ON A SERVER UTILIZING WEB BROWSERS

(71) Applicant: International Business Machines Corporation, Armonk, NY (US)

(72) Inventors: Toby Kurien, Midrand (ZA); Richard Allen Young, Johannesburg (ZA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/839,701

(22) Filed: Apr. 3, 2020

(51) Int. Cl.
| G06F 16/958 | (2019.01) |
| G06F 16/955 | (2019.01) |
| G06F 9/54   | (2006.01) |
| G06F 16/16  | (2019.01) |
| G06F 16/908 | (2019.01) |

(52) U.S. Cl.
CPC .............. *G06F 16/958* (2019.01); *G06F 9/54* (2013.01); *G06F 16/168* (2019.01); *G06F 16/908* (2019.01); *G06F 16/955* (2019.01)

(58) Field of Classification Search
None
See application file for complete search history.

(56) References Cited

U.S. PATENT DOCUMENTS

| 10,379,820 B1 | 8/2019 | Nagar et al. | |
| 2003/0126157 A1* | 7/2003 | Young | G06F 16/10 |
| 2012/0166959 A1* | 6/2012 | Hilerio | G06Q 10/00 715/738 |
| 2012/0226999 A1* | 9/2012 | Seo | G06F 16/957 715/760 |
| 2012/0331408 A1* | 12/2012 | Ainslie | G06F 16/954 715/760 |
| 2013/0024759 A1* | 1/2013 | Yuan | G06F 16/9574 715/205 |
| 2017/0177171 A1* | 6/2017 | Won | G06F 3/04883 |
| 2017/0293419 A1* | 10/2017 | Dipin | G06F 3/04842 |
| 2020/0387273 A1* | 12/2020 | Guta | G06F 9/44536 |
| 2020/0394234 A1* | 12/2020 | Chikkala | G06F 16/955 |

OTHER PUBLICATIONS

Romano, J., "WebMesh: A Browser-Based Computational Framework for Serverless Applications", https://pdfs.semanticscholar.org/9996/e164c80ea2471c8306dfc01759411dc35efc.pdf, May 1, 2019, 15 pages.

Aboukhalilich, R. "Beyond the Browser: Getting Started With Serverless WebAssembly", https://www.smashingmagazine.com/2019/08/beyond-browser-serverless-webassembly/, Aug. 28, 2019, Accessed Dec. 27, 2019, 9 pages.

(Continued)

*Primary Examiner* — Charles E Anya
(74) *Attorney, Agent, or Firm* — Scully, Scott, Murphy & Presser, P.C.; Shimon Benjamin

(57) ABSTRACT

A web browser can be run on a back-end server to execute serverless functions. A request is received to execute a function, for example, on-demand. The request is forwarded to a web browser running as an execution engine on the back-end server. The function is executed inside the web browser running on the back-end server. A result of the function executed inside the web browser can be returned.

20 Claims, 7 Drawing Sheets

(56) References Cited

OTHER PUBLICATIONS

Hall, A., et al. "An Execution Model for Serverless Functions at the Edge", IoTDI'19 Proceedings of the International Conference on Internet of Things Design and Implementation, Apr. 18, 2019, pp. 225-236.
Scott, W., et al. "freedom.js: an Architecture for Serverless Web Applications", https://pdfs.semanticscholar.org/8146/9e8e5775ca8145329282807dc7840e78c8c8.pdf?_ga=2.251382598.1545514464.1585927224-1065621289.1585927224, 2016, Accessed on Apr. 3, 2020, 15 pages.
Wikipedia, "Serverless Computing", https://en.wikipedia.org/wiki/Serverless_computing, Last edited on Mar. 6, 2020, Accessed on Mar. 11, 2020, 7 pages.
Tresness, C., "Understanding Serverless Cold Start." https://azure.microsoft.com/en-us/blog/understanding-serverless-cold-start/, Posted Feb. 7, 2018, Last updated Jun. 2019, Accessed on Mar. 11, 2020, 8 pages.
Apache Openwhisk, "Open Source Serverless Cloud Platform." https://openwhisk.apache.org/. Accessed on Mar. 12, 2020, 7 pages.
Cloudflare Workers, "You Write Code We Handle the Rest." https://workers.cloudflare.com/, Accessed on Mar. 12, 2020, 4 pages.
Fly, "Deploy App Servers Close to Your Users", https://fly.io/, Accessed Mar. 12, 2020, 2 pages.
NIST, "NIST Cloud Computing Program", http://csrc.nist.gov/groups/SNS/cloud-computing/index.html, Created Dec. 1, 2016, Updated Oct. 6, 2017, 9 pages.
Github, "IBM / browser-functions", https://github.com/IBM/browser-functions,Nov. 13, 2019, Accessed on Apr. 3, 2020, 22 pages (Grace Period disclosure).

\* cited by examiner

EXECUTING FUNCTIONS ON-DEMAND ON A SERVER UTILIZING WEB BROWSERS

STATEMENT REGARDING PRIOR DISCLOSURES BY THE INVENTOR OR A JOINT INVENTOR

The following disclosure is submitted under 35 U.S.C. 102(b)(1)(A): DISCLOSURE: https://github.com/IBM/browser-functions, 13 Nov. 2019.

BACKGROUND

The present application relates generally to computers and computer applications, and more particularly to executing functions on demand on a computer system.

Building a modern World Wide Web ("web") app or application can involve using a few different tools: one set for the front-end, and another for the back-end. Creating such an app can require learning and using a different application programming interface (API) (and often even a different programming language) for the back-end. This barrier between front-end and back-end development has led to many developers assuming one of the two roles (either front-end, or back-end), because developing the full stack has a considerable learning curve.

In serverless technology, which for example can be provided within Cloud Computing, a service provider can allow developers to deploy functions which are executed on-demand, and are only billed per function execution, rather than pay for an entire server running continuously even if it is idle. In such serverless technology, however, development can become difficult as there may not be an adequate amount of development tools made available. Each serverless vendor may also have its own API, which may require learning a new API and making functions dependent on that one vendor. To move to another vendor, one would have to re-write functions and learn a new API. Spinning up an environment on-demand to execute functions is a slow and resource-hungry process, as it needs to spin up an entire virtual environment with operating system (OS) and libraries, to execute the function. This cold start can take time, which can make an existing serverless system slow and expensive in many scenarios. In addition, the execution environment may be made up of many components, each of which may have security vulnerabilities that may or may not be fixed and patched quickly.

BRIEF SUMMARY

A system and method for executing functions on-demand on a server can be provided. The system, in one aspect, can include a server operable to receive a request to execute a function on-demand. The system can also include a web browser operable to run on a back-end server as an execution engine, the web browser operable to open multiple tabs. The multiple tabs can include a controller tab and at least one worker tab. The server can be further operable to forward the request to the web browser, the web browser operable to execute the function inside the web browser running on the back-end server. The server can be further operable to receive a result of the function executed inside the web browser.

A computer-implement method, in one aspect, can include receiving a request to execute a function. The method can also include forwarding the request to a web browser running as an execution engine on a back-end server. The method can further include executing the function inside the web browser running on the back-end server. The method can also include returning a result of the function executed inside the web browser.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
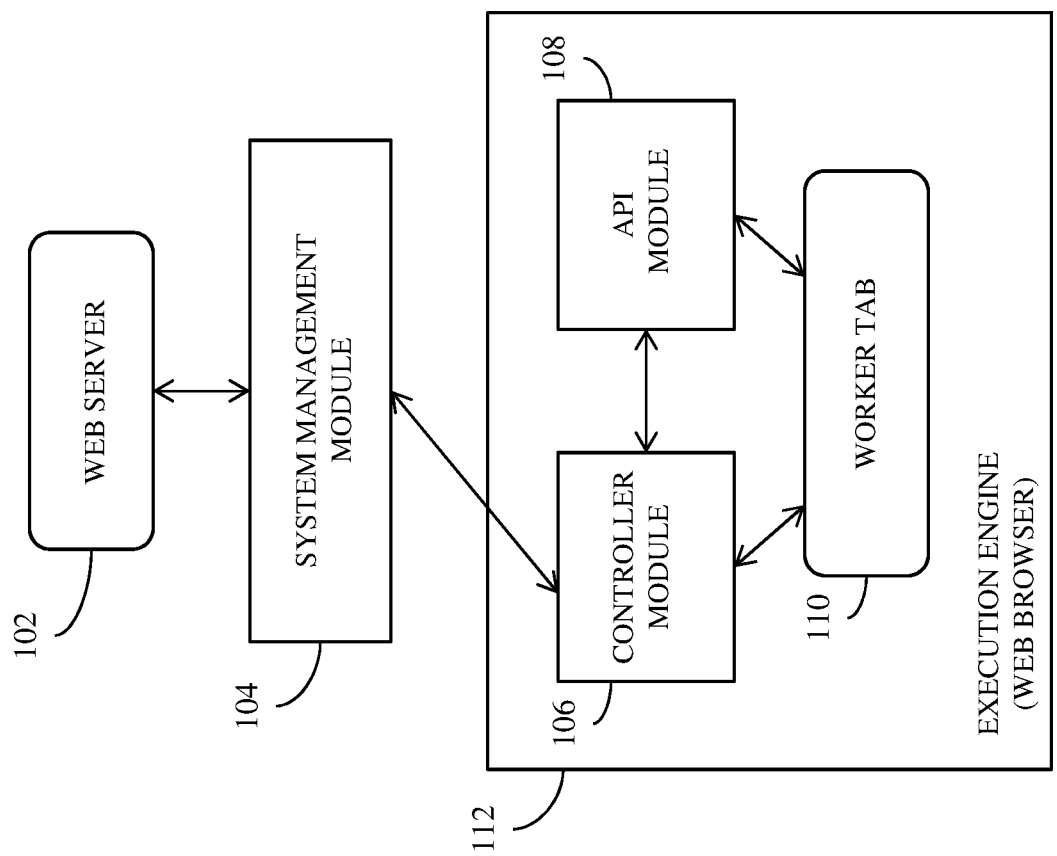
FIG. 1 is a diagram illustrating a system diagram including functional blocks of a system in an embodiment.

A system, method, and/or technique are disclosed for a serverless platform that can execute functions on-demand inside one or more web browsers running on one or more servers. A system in an embodiment includes a web server, a system management module to process incoming requests and return responses, a controller module to execute functions within a web browser, and an application programming interface (API) module to provide integration into the server environment. A module can be a computer-implemented component such as a computer program, an application, a function, and/or a hardware component implementing a function.

The web API is a rich and stable API, and the web browser is a stable, powerful and secure execution environment. The system, in an embodiment can utilize existing front-end capabilities directly on the back-end, by allowing front-end code to execute on the back-end, within a web browser as an execution engine. Such a web browser can include development tools built in for debugging and executing a code, and thus, in an aspect, developers can completely develop and debug their code on their local machines before deploying to a server.

In an aspect, the system can utilize one or more web APIs, which are standard. For instance, all browsers usually implement the web API according to a specification. Thus, in the system disclosed herein, in an embodiment, there is no vendor lock-in.

In an embodiment, spinning up an execution environment for a browser based function can be simple as opening a tab, which executes in a few milliseconds. Tabs are also lightweight, making this a fast and lightweight solution with no cold-start problem.

Security of web browsers is constantly tested and fixes are implemented very quickly, usually within a day, and made available to the public. For instance, due to the wide and prevalent use of web browsers, the vendors rush to patch security vulnerabilities as fast as possible. Since the execution engine in the system in one embodiment is a web browser (e.g., a single component), it can be easily updated, usually automatically.

The system disclosed herein in an embodiment also provides the ability to scale easily, by running multiple web browsers connected to a server. The system can also provide the ability to easily execute functions within a private network, without setting up any infrastructure (e.g., firewalls, servers, domain name system (DNS) entries, etc.). In an embodiment, in the system, all that is needed can be to run a web browser from inside the private network and connect it to the server. The system can further provide the ability for functions to easily use hardware acceleration in the form of 3D (3-dimensional) graphics cards, since web browsers support these via the WebGL API. WebGL takes advantage of GPU hardware. The system can also provide the ability to isolate and sandbox running functions from one another and from the host operating system by means of domain isolation, whereby each function executes in a browser tab using a unique domain name, thus appearing to the browser as separate web sites. The system can further provide the ability to use the browser's efficient Cascading Style Sheets (CSS) engine for image processing, e.g., generate thumbnails, blur images, etc. Briefly, CSS provides a mechanism for adding style to web documents. The system can further provide the ability to interface with Internet of Things (IoT) and physical hardware on the server by using standards such as WebUSB, WebSerial, and Web Bluetooth.

FIG. 1 is a diagram illustrating a system diagram including functional blocks of a system in an embodiment. In an aspect, the system and/or method executes functions on-demand on a server utilizing web browser execution engines. The system can include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices 104 may be configured to selectively store instructions executable by one or more hardware processors 102.

A processor or hardware processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

A web server 102 accepts incoming one or more requests from one or more clients. The web server can be implemented as a standard web server. The web server 102 can include a computer processor and function as a back-end computer, and for example, can communicate with one or more client (front-end) devices, for example, remotely. The web server 102 forwards the incoming requests to a system management module 104. The system management module 104 forwards the client requests to a controller module 106 running inside a web browser execution engine 112. In an embodiment, the controller module 106 can be a component run by or within a web browser, for example as a web page within a web browser tab, or as a web browser plug-in, add-on, or extension. In another embodiment, the controller module 106 can be part of a browser automation tool, such as Puppeteer or Selenium. Such a tool can provide a library, which may include an API, to control a web browser (e.g., headless web browser). The controller module 106 can be programmed to accept requests forwarded by the system management module 104. The system management module 104 also allows for creating, editing and deleting stored functions. The controller module 106 executes the function (e.g., a requested function) in a tab 110 within a web browser execution engine 112, times out any functions that become non-responsive or utilize too many resources, and collates the result or errors which are then passed back to the system management module 104. Each web browser execution engine 112 can have a controller module 106 running inside it. An API module 108 allows the executing functions to access environment information, set return parameters, and manage their lifecycle.

In an embodiment, the web server 102 and the system management module 104 may run on the same physical server. In another embodiment, the web server 102 and the system management module 104 may run on different physical servers and communicate with a network or communication interface. In an embodiment, a server running the web browsers 112 may be on the same server as the web server 102 and the system management module 104. In another embodiment, a server running the web browsers 112 may be a different server from one or more servers running the web server 102 and the system management module 104. For example, all components can run on a single server, or different servers. In an embodiment, the system can be scaled out by running multiple additional web-browser execution servers 112, which may all connect via one or more communication networks to the system management module 104.

In an embodiment, the controller module 106 is started by opening a web browser (on that server) and visiting or navigating to a Uniform Resource Locator (URL) pointing to the system management module 104. Program code (e.g., Hypertext Markup Language (HTML) and JavaScript codes) is downloaded and executed inside the web browser. This code forms the controller module which creates a persistent connection (e.g., WebSocket connection) to the system management module 104. This persistent connection listens for any incoming functions to execute. In an embodiment, the web browser can run continuously, for example, as a background process, for example, also referred to as headless mode. The system management module 104 can start the web browser and thus the controller module 106. The system management module 104 can start as many web browsers as it needs.

In an embodiment, the system management module 104 may manage the entire system. For instance, the system management module 104 contains all the functions that have been deployed by developers, manages their access and permissions, can spin up or shutdown execution engines, processes incoming requests, forwards execution jobs to one or more controllers (and hence load balances the system), and parses the results of the execution and returns the results of the execution back to the web server 102 to be sent back to the clients that made the request. An incoming request can be a request from a user, for example, a request to execute a specific function with specific parameters. An example of an incoming request can be an HTTP GET method, e.g., "https://examples.browserfunctions.com/execute/hello/function.html". HTTP refers to Hyper Text Transfer Protocol. There may be one controller running per web browser instance. For example, each web browser instance has a controller module running in a tab for the controller module to be part of the pool of execution environments (e.g., web browser environments). In an embodiment, there may be as many controllers as desired and/or as many web browsers as desired.

In an embodiment, the system management module 104 may include a user interface, e.g., a graphical user interface, via which a user or a developer can add, delete, update, and/or access functions, which can be executed within a web browser execution engine 112, e.g., by a controller module 106.

In an embodiment, for each web browser execution engine 112, there is a controller module 106 that communicates with the system management module 104, using for example a persistent WebSocket connection. For instance, in an embodiment, each execution environment (e.g., a web browser) has one controller module running in a tab. This controller module 106 executes within the web browser 112, and processes incoming job execution requests from the system management module 104. For instance, the process of visiting or navigating a URL from a browser tab downloads code (e.g., HTML and JavaScript) and then executes it. In an embodiment, the code that is downloaded and executed is the controller module. The controller module is implemented as a web page. In an embodiment, the controller module 106 executes a job or function specified by the system management module 104 in its call or invocation to the controller module 106. For example, the system management module 104 decodes the request to execute a function. The system management module 104 then passes the function to execute and the parameters via the WebSocket connection to the controller module 106. The controller module 106 then executes this function inside the web browser execution environment by opening a new tab and loading the function code inside of the new tab. In an embodiment, the jobs are executed within separate tabs or windows of the web browser 112, and the results are sent back to the system management module 104. In an embodiment, the controller module 106 executes functions in separate domains or hostnames, to keep the functions isolated from one another. The controller module 106 also handles errors, manages resource utilization, and provides the API module 108 with hooks into the server environment (e.g., environment variables, request and response headers, etc.).

In an embodiment, for each job that is executing within a web browser tab or window, there is an API module 108. The API module 108 provides the executing function with additional functionality, e.g., metadata about the request, environment variables, headers, etc. The API module 108 augments the standard browser API with functions to return values back to the controller module 106, read environment variables (e.g., database password), read function parameters. The API module detects whether it is running on a developer's local machine or on a backend server, and handles API calls accordingly, for example, by providing debugging information when running on a developer's machine. This allows function code to be executed locally during development and testing, and without modification, run on a server in production.

The web server 102 receives a web request specifying which stored function to run with optional function parameters. Such a web request can be specified using a Uniform Resource Locator (URL). Optional parameters can be specified in the URL query string, or in the body of the request. For example, the web server 102 receives a web request specifying which stored function to run with optional function parameters in a Uniform Resource Locator (URL) query string or in the body of the request. In an embodiment, the system management module 104 may include a user interface and present or display a URL for each function that is stored. This URL can be called directly by an end user. As another example, this URL can be embedded inside another application to be called, for example, at the time that application is run or executed. The system management module's user interface can allow developers or users to upload functions, list functions, edit functions, and retrieve an associated URL to execute a function and also a URL for connecting any web browser to a user's application as an execution environment.

The system management module 104 chooses an available execution environment using a predefined strategy. The predefined strategy can be round robin, random or least busy, and/or another strategy. If the user has put any restrictions on which execution environments the function can be executed in (e.g., only a particular web browser, or only user connected controllers) then only those execution environments are considered. An example of an execution environment is a browser (e.g., Chrome™ (from Google™, Mountain View, Calif.), or Firefox™ (from Mozilla™ Corporation, Mountain View, Calif.), or another browser) running on a server (e.g., with or without a graphical processing unit (GPU)). There may be multiple of web browsers running on various machines. The choice of execution environment can be specified by the developer of the function, e.g., "the function requires Chrome™ web browser with GPU access". The system management module 104 can choose an execution environment using a strategy based on these requirements and the available environments. As another example, a developer may also choose to run all their functions on their own execution environments. For example, the function may be running inside a private network and needs access to data on this network. In such an example scenario, the system management module 104 may redirect all function executions to the developer's own browser rather than the ones running on the server.

Once an execution environment has been selected, the type of function is determined, e.g., JavaScript, hypertext markup language (HTML), or WebAssembly. The type of function can be determined by reading or examining the function file extension (e.g., ".js" for JavaScript). The type of function can also be specified in the function's metadata. Based on the type of function, the user's function is embedded inside a template that allows the function to be executed natively inside a web browser, for example a JavaScript function is wrapped in script tags inside an HTML5 compliant web page. For example, the system management module 104 can embed the requested function inside such a template. A template is a boostrapping file that wraps the function file allowing it to execute inside a browser, and injects the API module. These templates can be stored in the system management module 104. A web page is dynamically generated by combining the template, the API module, and the function code. The system management module 104 or a controller module 106 may wrap the function code with the template to create the web page.

The API module 108 is injected into this template which provides environment information such as the current execution engine version, environment variables defined by the user, and helper methods for returning data or streaming data back to the original request. For example, the system management module 104 can inject the API module 108 inside such a template. A web page can be created by taking a template and adding in the function code and the API module code to make a version that is executable. In an aspect, a development version of the template and API module can be used by the developer to run and debug their function on their own local browser without the need for the server. The API module 108 can include a set of functions such as JavaScript functions, which can be imported into the web page by the template. For example, such JavaScript functions can be imported as a standard JavaScript library. An API is injected to make its functionality available to the function being executed.

Job execution metadata is compiled including function parameters and a URL to the dynamically hosted wrapped function. This job data is sent to the controller module 106 in the chosen execution environment, e.g., via a WebSocket connection. Job execution metadata includes all the data required for a tab in the execution browser to run the function (e.g., the requested function). The metadata includes data specifying how to access the function (e.g., the URL with the unique domain name of the function), what parameters to pass to the function when executing, and what environment variables to make available to the function. The system management module 104, for example, compiles the job execution metadata. In an embodiment, this data is compiled or collected at execution time, as this data may change between execution runs. This compiled packet of data is can be sent via the WebSocket to the controller module 106 for execution.

Responsive to the controller module 106 receiving a job, e.g., via the WebSocket connection from the system management module 104, the controller module 106 adds the job to a queue of current jobs. The controller module 106 opens and keeps track of a number of job execution tabs within the same browser instance. In an embodiment, the number of tabs can be pre-defined. In another embodiment, the number of tabs can grow and shrink based on pressure from the number of function executions.

Responsive to a job execution tab becoming free, a job from the current jobs queue is opened in the free tab. For example, the controller module 106 opens a job from the current jobs queue, which includes function parameters and a URL, in the free tab. In an aspect, a job includes all function execution metadata, which is all the information required to execute a job. The entry point (main method) of the function is called passing in any parameters specified by the user. For example, a thread or process may start corresponding to the function.

If the function becomes unresponsive by locking up the thread, or takes longer than a predefined timeout period, the controller module 106 can terminate execution of the function, pass the error back to the system management module 104, and free up the execution tab.

If the function returns a value, then it is returned to the controller module 106, and subsequently to the system management module 104, where it is returned in the body of response to the original web request.

If the function makes use of the streaming helper method provided by the API module 108, then data can be sent back to the original caller without terminating function execution, allowing the function to stream data over a period of time.

In an embodiment, the management interface of the system management module 104 may include an interface for allowing users such as developers to add functions. For example, a graphical user interface may allow a user to drag and drop a function file to the management interface of the system management module 104.

The following illustrates a use case scenario in an embodiment. Suppose a developer would like to create a function to count the number of times a visitor has accessed a website. The website itself may be statically hosted (e.g., no application server is used, but a plain web server, e.g., to keep costs down). The following illustrates how the developer may use this system. The developer creates a simple function to store the "hit count" using a storage mechanism. This storage may be as simple as using the Local Storage feature of all web browsers. An example code may include:

```
function main(args) {
    var currentHits=localStorage.getItem('hits');
    currentHits=currentHits+1;
    localStorage.setItem('hits', currentHits);
    return currentHits;
}
```

The developer drags and drops the function file into the management interface of the system management module 104. The function is deployed by the system management module 104, and users can immediately access the function using its unique URL. Deploying a function includes saving or storing the code of the function to disk or to a database, and registering the function in a list of available functions that can be executed. A URL can be assigned to the function, and for example, presented or displayed to the user once the function has been uploaded and deployed. In an aspect, the URL associated with the function is unique, For example, a URL containing the username of the developer, and the function name can be assigned or associated with the function: e.g., http://browserfunctions.org/execute/username/function-name. Other unique name can be assigned.

The developer may embed this URL into a web page, which would then execute this function every time a user visits that page. This web page can then make calls to the developer's hosted function. Such a web page is an example of an external application that can make calls to execute functions.

The functions run inside a web browser, e.g., a web page that runs the function is created to run inside a web browser. For example, as described above, at execution time the function can be embedded into a template that makes the function able to run inside a web browser. Running functions inside a web browser allows for use of a tool such as the Cascading Style Sheets (CSS) rendering engine within a web browser to perform image processing tasks, such as resizing, cropping, blurring, modifying colour properties, etc. The developer can also make use of a physical device (e.g., IoT device) attached to the server, by making use of the WebUSB, WebBluetooth, and/or WebSerial APIs. This would be useful, for example, in home automation, where the function can be used to turn on lights or appliances, read sensor data like light or temperature, etc. For example, the developer can develop code or function, which utilizes and/or calls on CSS, WebUSB, WebBluetooth, and/or WebSerial APIs, and/or others.

The system and/or method in embodiments can efficiently execute functions on-demand on a server utilizing web browsers as an execution engine 112. In an embodiment, the execution engine 112 can include one or more worker tabs 110 or windows, each with an API module 108. These worker tabs 110 execute the functions. In an embodiment, the execution engine 112 includes a controller tab or window that runs a controller module 106. In an embodiment, the API module 108 provides functions and metadata to the function executing within the execution engine, e.g., via a plurality of JavaScript methods and variables. These functions and variables provide: function arguments, environment variables, callbacks for returning results and errors, and an entry point to the function (e.g. a main method).

In an embodiment, the controller module 106 has a persistent connection to a system management module 104 running on a server, using for example a WebSocket. The controller module 106 accepts job execution requests from the system management module 104, opens or re-uses worker tabs 110, executes functions, processes and returns the results or errors, terminates any function executions that become unresponsive or use too many resources. The controller module 106 can execute the functions by sending a specific web URL to a free worker tab 110, such that different functions use different domain names, to ensure isolation and security.

In an embodiment, the system management module 104 executes on a server or a computer. The system management module 104 processes incoming web requests from a standard web server 102 or a web server that is built-in. The system management module 104 can contain all the function code that has been uploaded by developers, manage access and permissions, can spin up or shutdown execution engines 112, process the incoming requests, forward execution jobs to one or more controllers 106 (and hence load balances the system), and parse the results of the execution and return these back to the web server 102 to be sent back to a client that made the request.

In an embodiment, a function can provide an API service for image processing functionality, e.g., using Cascading Style Sheets (CSS) such as blurring, filtering, resizing, cropping and rotating. A function can also provide an API service for running central processing unit (CPU) intensive tasks distributed over multiple browser tabs on multiple servers.

In an embodiment, one or more controller tabs can run inside private networks while maintaining a persistent connection to a central system management module, allowing functions to execute within multiple hosted cloud or private network environments.

In an embodiment, one or more controller tabs can run on an IoT device and interface with hardware on the device via WebUSB, WebSerial, or WebBluetooth allowing a function call to directly manipulate or read data from the hardware connected to the IoT device.

Figure 2:
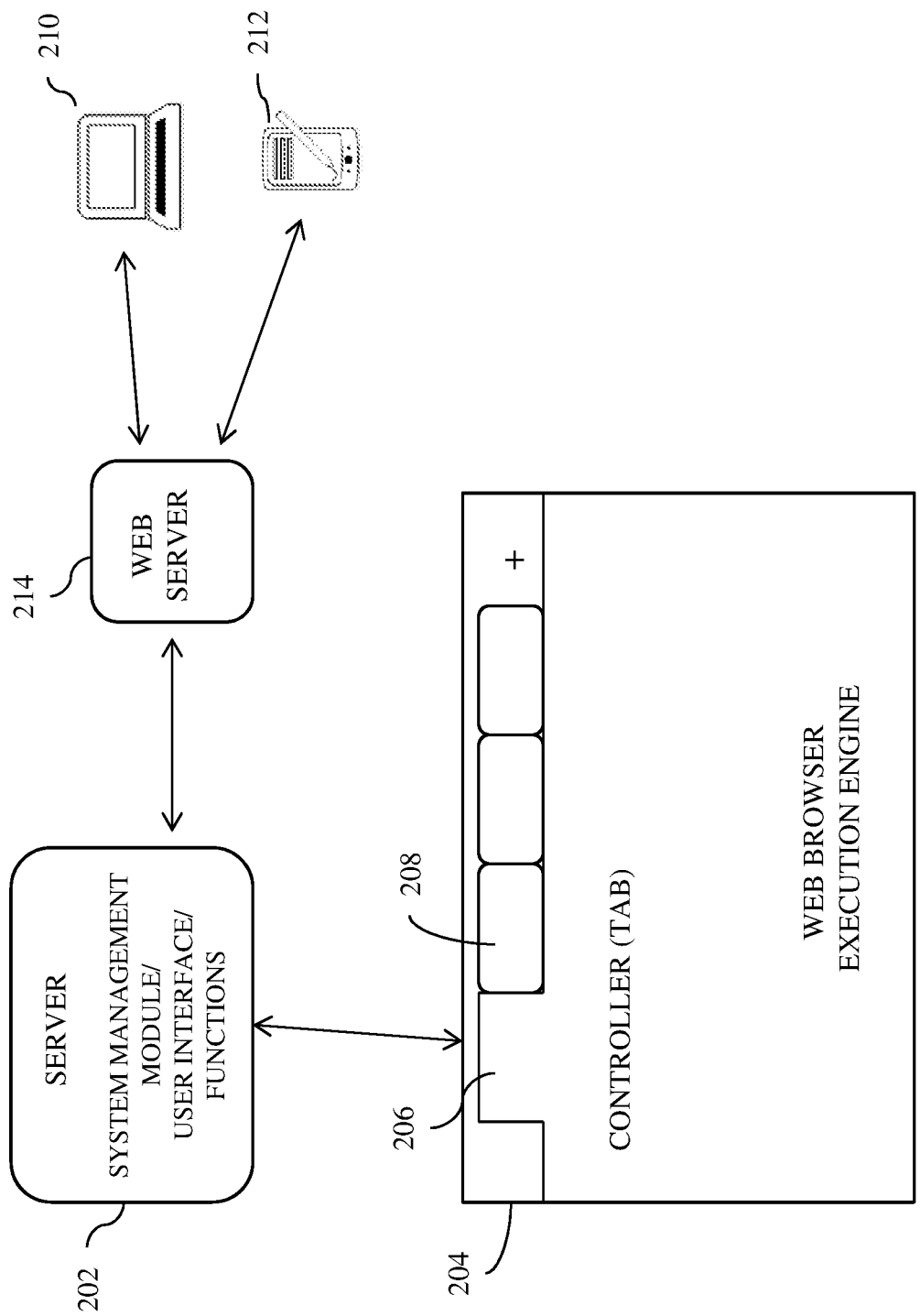
FIG. 2 is another diagram illustrating components of a system in an embodiment.

FIG. 2 is another diagram illustrating components of a system in an embodiment. A system management module 202 (e.g., also shown in FIG. 1 at 104) executes on a server or a computer. The system management module can also include a user interface for allowing a user or developer to add, delete and/or update, access and/or manage functions. The system management module 202 processes incoming web requests from a web server 214, for example, received from one or more client devices 210, 212. The system management module 104 can contain or include function codes, which have been uploaded by developers. As described with reference to FIG. 1, the system management module 202 and the web server 214 can run on the same physical server or different physical servers.

A controller module 206 executes in an execution engine 204, which can be a web browser. The controller module 206 has a persistent connection to a system management module 202 running on a server, using for example a WebSocket. The controller module 206 can run in a web browser tab. The controller module 206 accepts job execution requests from the system management module 104, opens or re-uses worker tabs 208, executes functions, processes and returns the results or errors, terminates any function executions that become unresponsive or use too many resources. The controller module 206 can execute the functions by sending a specific web URL to a free worker tab 208, such that different functions use different domain names, to ensure isolation and security. A worker tab 208 can execute a specified function. A worker tab 208 can also run an API module (e.g., shown at 108 in FIG. 1). Results of the execution can be returned to one or more requesting client devices 210, 212, e.g., via the system management module 202. As described with reference to FIG. 1, the system management module 202 and the web server 214 can run on the same physical server or different physical servers. The web browser or execution engine 204 may run on the same or different physical servers as the system management module 202 and/or the web server 214. For example, all components can run on a single server, and the system can be scaled out by running multiple additional web-browser execution servers 204, which can all connect via one or more communication networks to the system management module 202.

Figure 3:
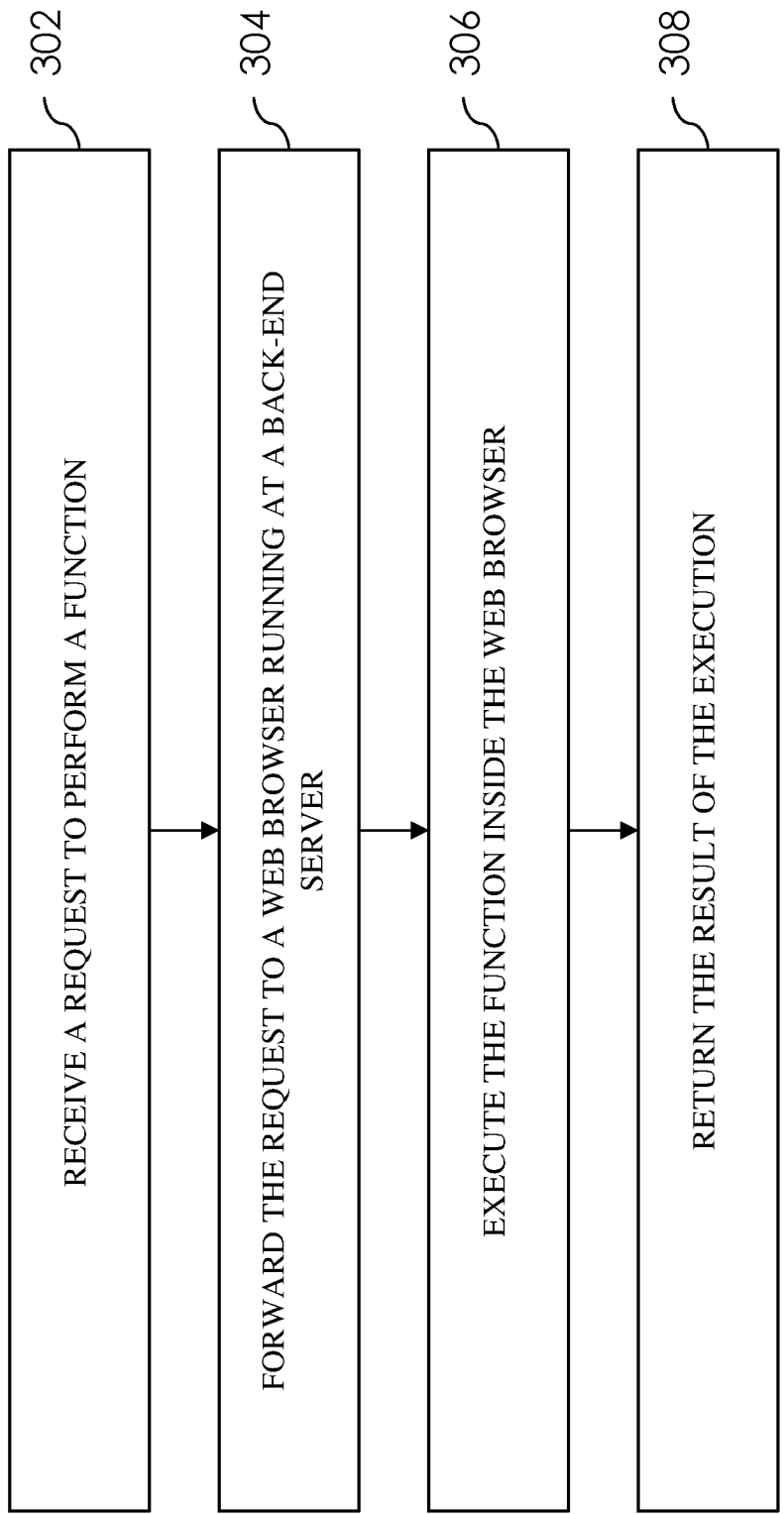
FIG. 3 is a flow diagram illustrating a method in one embodiment.

FIG. 3 is a flow diagram illustrating a method in one embodiment. The method can efficiently execute functions on-demand on a server utilizing web browsers as an execution engine. The method can be executed on or by one or more hardware processors. At 302, a request to perform a function is received by a server, for example, a system management module running on a server on a back-end server or system. The request may be received from a web server, which for example, receives a web request from a client or front-end device via a remote communication network. A server or a back-end server can be any server or computer, and can provide functionalities or services, e.g., to other devices such as client devices.

At 304, the request is forwarded to a web browser, e.g., a controller or controller module run as a web browser tab. The web browser that is forwarded the request is running on a back-end server or system, and can be employed to run serverless functions on the back-end server or system. In an embodiment the request is forwarded to the web browser via a persistent connection established with the server receiving the request and the web browser (e.g., the back-end server). In an embodiment, the persistent connection can be a WebSocket connection. Another communication protocol or connection can be used such as, but not limited to, WebRTC.

At 306, the web browser executes the function inside a web browser tab. For instance, the controller module running inside the web browser (e.g., as a web browser tab) receives the requested function, opens another tab (e.g., a worker tab) inside the web browser, which worker tab executes the function. For example, the controller module can execute the functions by sending a specific web URL to a worker tab. Different functions can use different domain names to ensure isolation and security. There may be multiple worker tabs, each executing a requested function. A worker tab may also include an API module, for example, which can execute within the worker tab, can provide functions and variables such as, but not limited to: function arguments, environment variables, callbacks for returning results and errors, and an entry point to the function (e.g. a main method) to the requested function being executed within the web browser (e.g., web browser tab).

At 308, a result of the execution is returned to the server, which may return the result back to a requesting client. The server, for example, may parse the results of the execution and return these back to a web server or another component from which the server received the request, to be sent back to a client that made the request.

Figure 4:
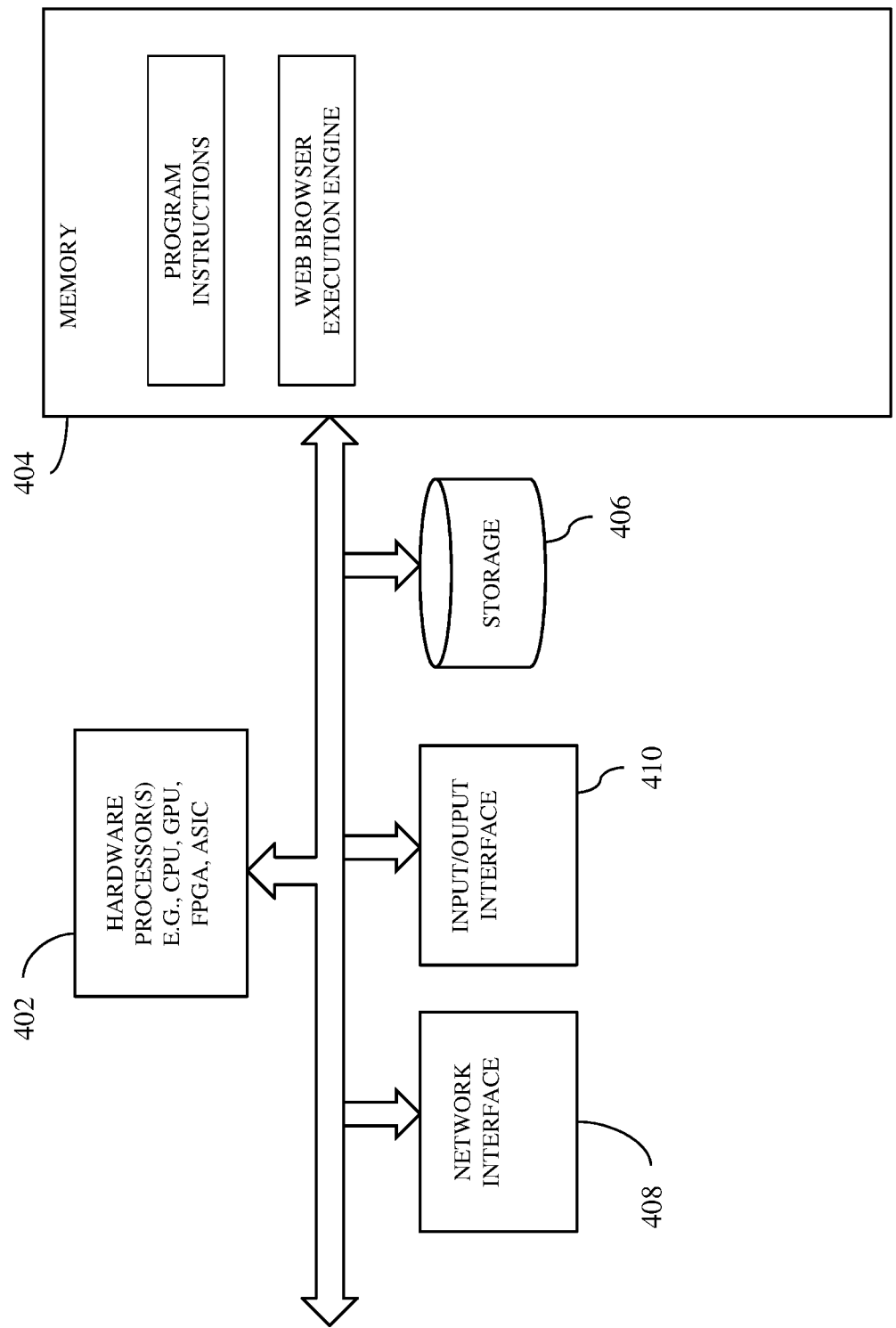
FIG. 4 is a diagram showing components of a system in one embodiment, which can execute functions on-demand on a server utilizing a web browser as an execution engine.

FIG. 4 is a diagram showing components of a system in one embodiment, for example, which can execute functions on-demand on a server utilizing a web browser as an execution engine. One or more web browsers can be used on a back-end server to run serverless functions. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and function as a server. One or more processors 402 may also function as a back-end server, which runs one or more web browser execution engines. A server and a back-end server may be different computer processors or same computer processors. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input including a request, e.g., a web request to execute a function on-demand on a back-end server. For instance, at least one hardware processor 402 may forward the request to a web browser functioning as a back-end execution engine. The web browser can execute the function inside the web browser running on the back-end server. One or more hardware processors 402 may receive a result of the function executed inside the web browser and return the result to a requesting device. In one aspect, functions may be stored in a storage device 406 or received via a network interface 408 from a remote device, and may be temporarily loaded into a memory device 404 for execution. One or more hardware processors 402 may be coupled with interface devices such as a network interface 408 for communicating with remote systems, for example, via a network, and an input/output interface 410 for communicating with input and/or output devices such as a keyboard, mouse, display, and/or others. For instance, a developer may add, update, delete and/or manage functions via a user interface using one or more input and/or output devices.

Figure 5:
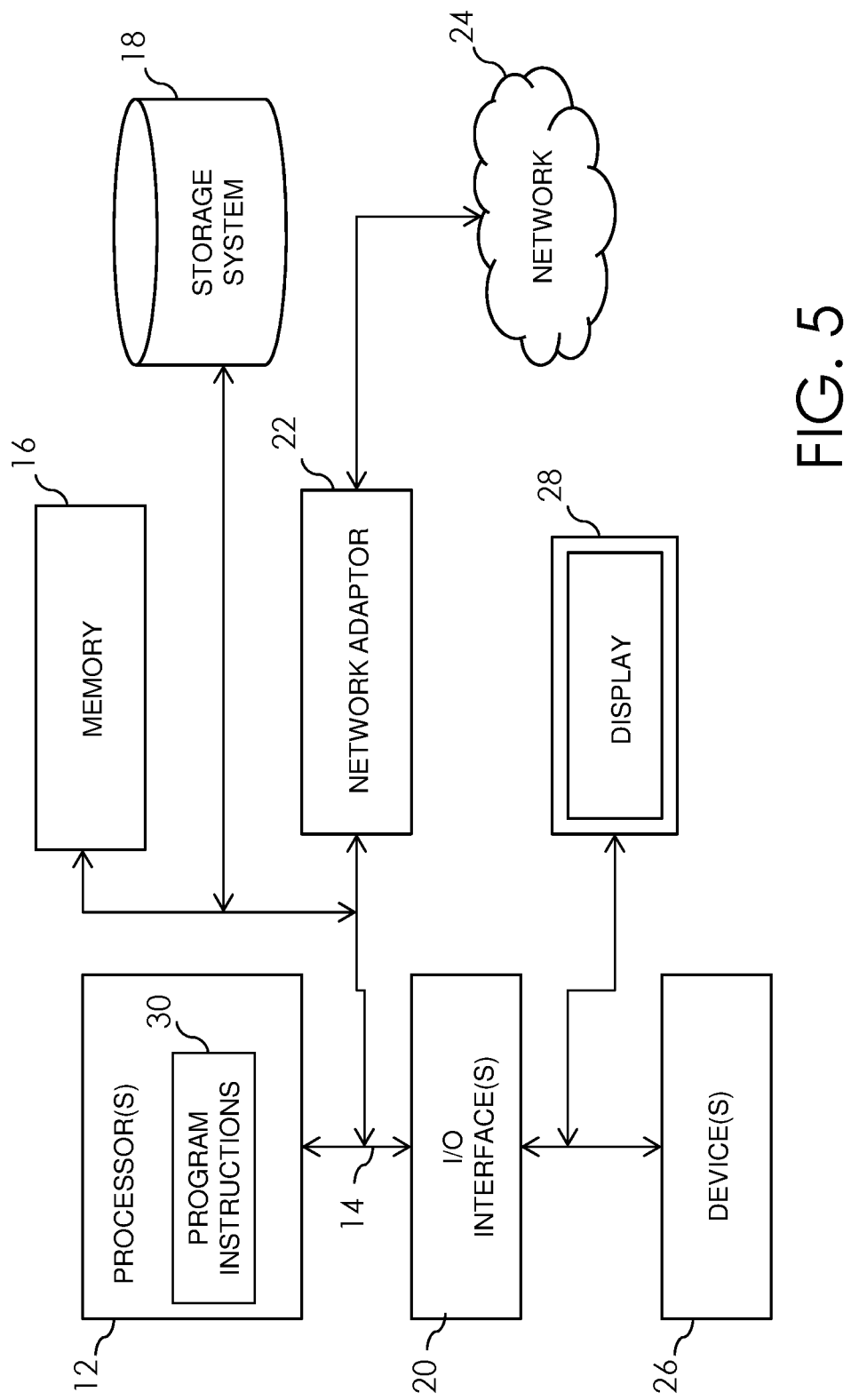
FIG. 5 illustrates a schematic of an example computer or processing system that may implement a system in one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
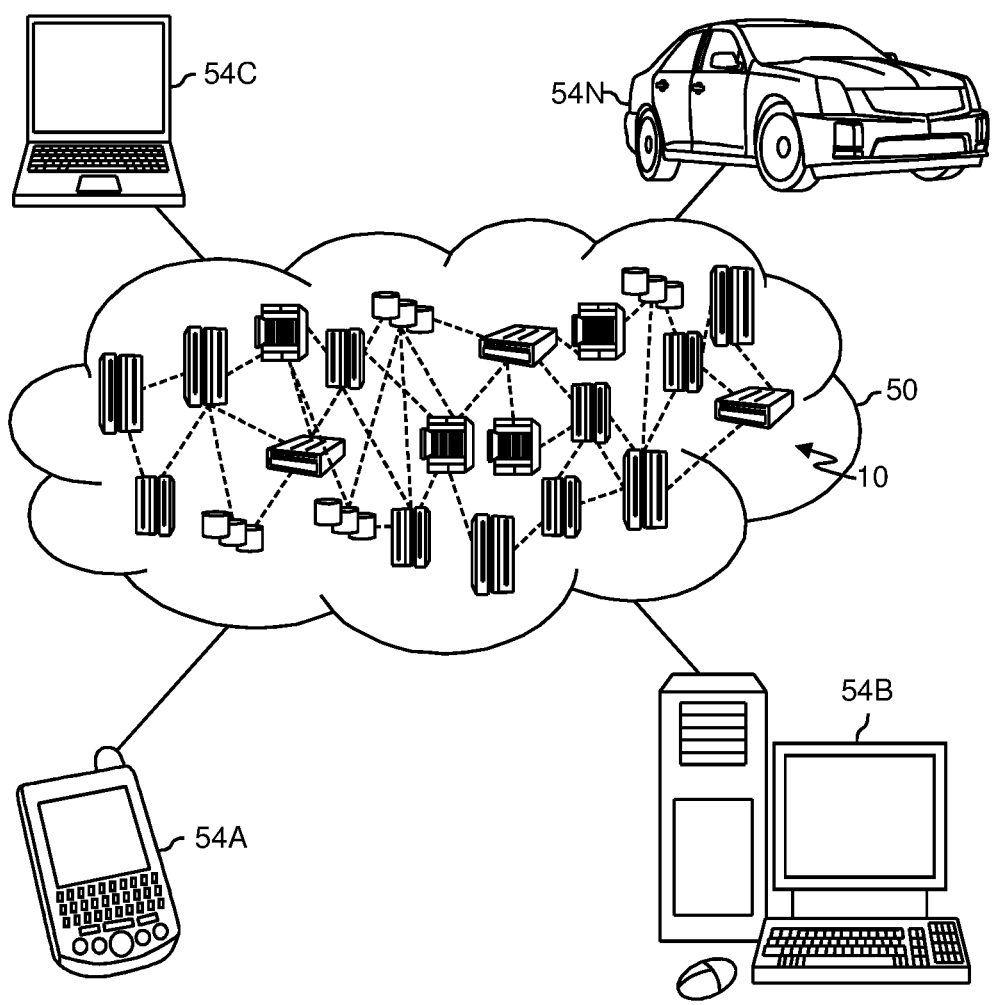
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
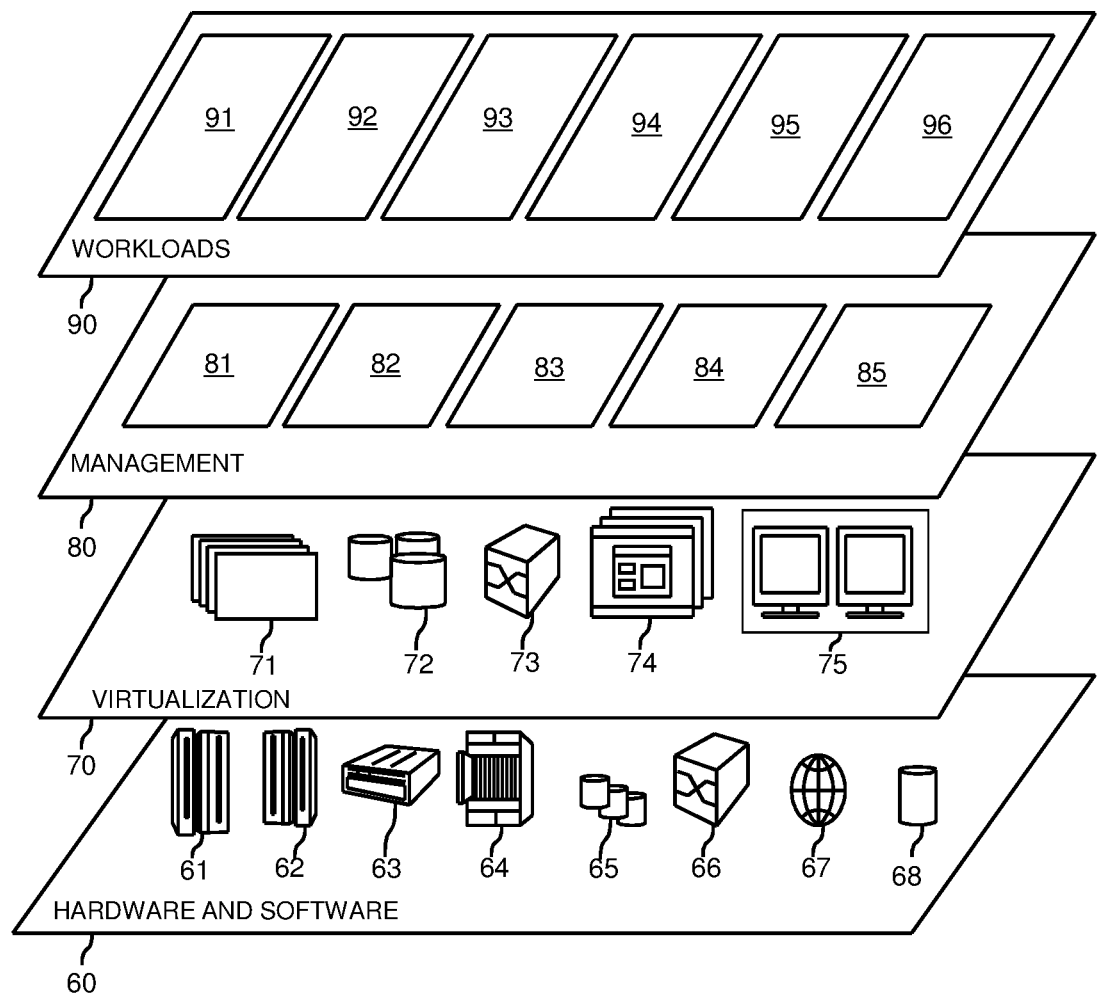
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and on-demand serverless function processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for executing functions on-demand in a back-end server using an execution engine, the system comprising:
  a memory;
  a processor;
  a web server that receives a request to execute a function on-demand from a client;
  a web browser that runs on the back-end server as the execution engine, wherein the web browser opens multiple tabs, wherein the multiple tabs include a controller tab and at least one worker tab; and
  the web server that forwards the request to the web browser running on the back-end server, wherein the web browser executes the function inside the web browser running on the back-end server, wherein the controller tab of the web browser automatically opens the worker tab of the web browser and load function code of the function inside the worker tab responsive to the web browser receiving the request, wherein the web server receives a result of the function executed inside the web browser, wherein a system management module embeds the function inside a template and injects an Application Programming Interface (API) module into the template for running and debugging the function, wherein the template being a boostrapping file that wraps a file containing the function to create the worker tab, and wherein the file containing the function is received from a user.

2. The system of claim 1, further including a persistent connection established between the web browser and the web server, wherein the request is forwarded to the web browser using the persistent connection.

3. The system of claim 1, wherein the web server is operable to forward the request to the controller tab of the web browser, the controller tab opening the worker tab with a Uniform Resource Locator (URL) associated with the function.

4. The system of claim 3, wherein the URL is specified with a different domain name from another worker tab opened in the web browser executing another function.

5. The system of claim 3, wherein the application programming interface (API) is invoked within the worker tab, and wherein the API providing metadata is associated with executing the function.

6. The system of claim 3, wherein the API providing environment variables is associated with at least one of the web browser, the back-end server and the worker tab.

7. The system of claim 1, wherein the request includes a web request.

8. The system of claim 1, wherein the web server stores functions for execution, wherein the function is one of the functions stored on the web server.

9. The system of claim 8, wherein the web server includes a user interface via which a user manages the functions.

10. A computer-implement method of executing functions on-demand in a back-end server using an execution engine, the computer-implement method comprising:
- receiving a request to execute a function from a client;
- forwarding the request to a web browser running as the execution engine on the back-end server;
- executing the function inside the web browser running on the back-end server, wherein the web browser having at least a controller tab and a work tab, wherein responsive to the web browser receiving the request, the controller tab of the web browser automatically opening the worker tab of the web browser and loading function code of the function inside the worker tab, wherein a system management module embeds the function inside a template and injects an Application Programming Interface (API) module into the template for running and debugging the function, wherein the template being a boostrapping file that wraps a file containing the function to create the worker tab, and wherein the file containing the function is received from a user; and
- returning a result of the function executed inside the web browser to the client.

11. The method of claim 10, wherein the request is forwarded to the web browser using a persistent connection established to the web browser.

12. The method of claim 10, wherein the executing the function inside the web browser includes opening the worker tab with a Uniform Resource Locator (URL) associated with the function.

13. The method of claim 12, wherein the URL is specified with a different domain name from another worker tab opened in the web browser executing another function.

14. The method of claim 13, wherein the application programming interface (API) invoked within the worker tab, the API providing metadata associated with executing the function.

15. The method of claim 10, wherein the request includes a web request.

16. A computer program product comprising a non-transitory computer readable storage medium having program instructions embodied therewith, the program instructions executable by a device to execute functions on-demand in a back-end server using an execution engine, the program instructions cause the device to:
- receive a request to execute a function from a client;
- forward the request to a web browser running as the execution engine on the back-end server;
- execute the function inside the web browser running on the back-end server, wherein the web browser having at least a controller tab and a work tab, wherein responsive to the web browser receiving the request, the controller tab of the web browser automatically opens the worker tab of the web browser and loads function code of the function inside the worker tab, wherein a system management module embeds the function inside a template and injects an Application Programming Interface (API) module into the template for running and debugging the function, wherein the template being a boostrapping file that wraps a file containing the function to create the worker tab, and wherein the file containing the function is received from a user; and
- return a result of the function executed inside the web browser to the client.

17. The computer program product of claim 16, wherein the request is forwarded to the web browser using a persistent connection established to the web browser.

18. The computer program product of claim 16, wherein the device caused to execute the function inside the web browser includes the device caused to open the worker tab with a Uniform Resource Locator (URL) associated with the function.

19. The computer program product of claim 18, wherein the URL is specified with a different domain name from another worker tab opened in the web browser executing another function.

20. The computer program product of claim 19, the application programming interface (API) is invoked within the worker tab, and wherein the API providing metadata is associated with executing the function.

* * * * *